June 6, 1972   B. W. BOWDEN   3,667,727
SEAT FOR BALL OR GATE VALVES
Filed May 10, 1971   2 Sheets-Sheet 1

INVENTOR.
BILLY W. BOWDEN
BY
Head & Johnson
ATTORNEYS

United States Patent Office 3,667,727
Patented June 6, 1972

3,667,727
SEAT FOR BALL OR GATE VALVES
Billy W. Bowden, P.O. Box 308, Hammond, La. 70401
Continuation-in-part of abandoned application Ser. No. 852,420, Aug. 22, 1969. This application May 10, 1971, Ser. No. 141,721
Int. Cl. F16k 5/20
U.S. Cl. 251—172     6 Claims

ABSTRACT OF THE DISCLOSURE

A seat for a ball or gate valve includes an insert which maintains a constant sealed contact with the ball or gate no matter what pressure differential exists between line pressure and the valve body cavity pressure.

RELATED APPLICATIONS

This invention is a continuation-in-part of S.N. 852,420 filed Aug. 22, 1969, for Ball or Gate Valve Seat, now abandoned.

BACKGROUND

For an understanding of the general state of the art to which this invention is directed reference is made to the following known prior U.S. patents:

| | |
|---|---|
| 2,674,436—Jones | 3,044,741—Grove |
| 2,747,600—Laurent | 3,068,887—Grove |
| 2,796,230—Grove et al. | 3,166,291—Grove |
| 2,810,543—Bryant | 3,379,410—Stewart |
| 2,861,771—Bryant | 3,497,177—Hulsey |
| 2,950,897—Bryant | |

SUMMARY

This invention is a continuation-in-part of S.N. 852,420 and/or gate valves wherein a valve set ring incorporates a piston-like seal insert which is movable relative to the valve seat holder and so adapted to maintain a constant seating contact with the valve closure ball or gate no matter what pressure differential exists between the line pressure and the valve body cavity pressure.

BRIEF DESCRIPTION OF THE DRAWING

The invention is best understood with reference to the accompanying drawing which illustrates several embodiments in accordance with this invention.

DETAILED DESCRIPTION

Before explaining the present invention in detail, it is to be understood that the invention is not limited in its application to the details of construction and arrangement of parts illustrated in the accompanying drawings since the invention is capable of other embodiments and of being practiced or carried out in various ways. Also it is to be understood that the phraseology or terminology employed herein is for the purpose of description and not of limitation.

Figure 1:
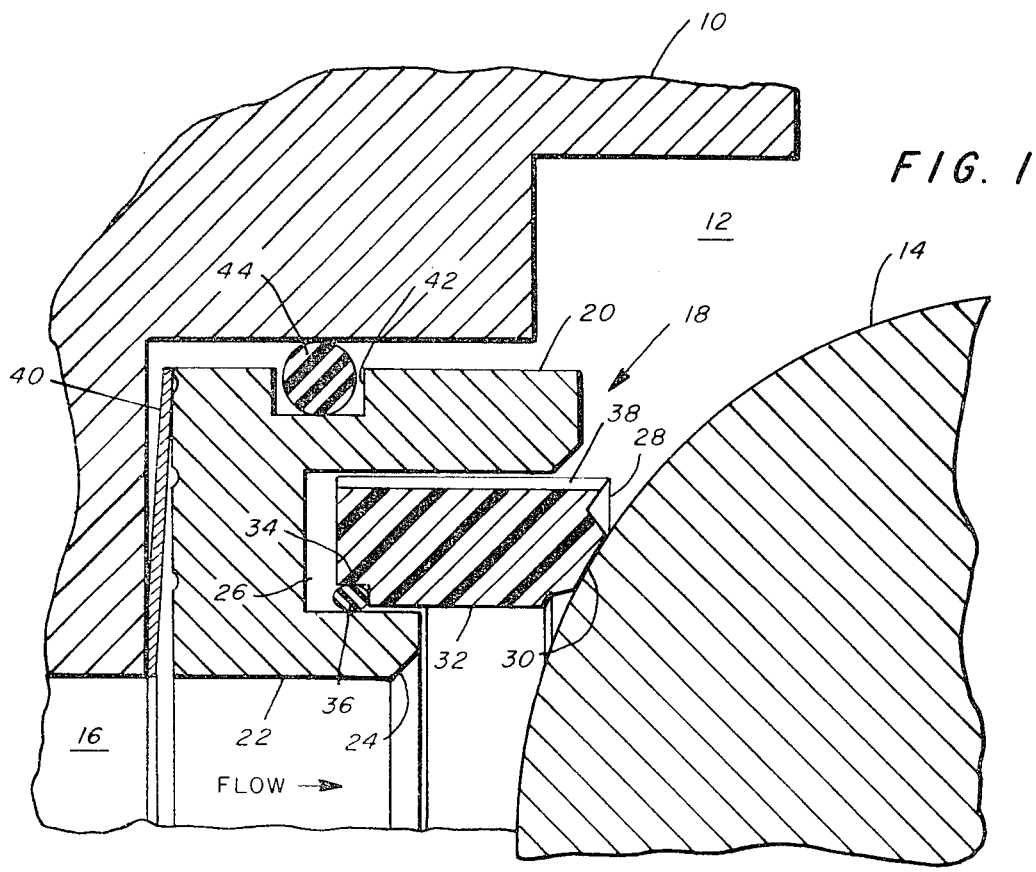
FIG. 1 is a fragmentary sectional view illustrating the seat and seal assembly in accordance with this invention for a ball-type valve closure element.
Figure 2:
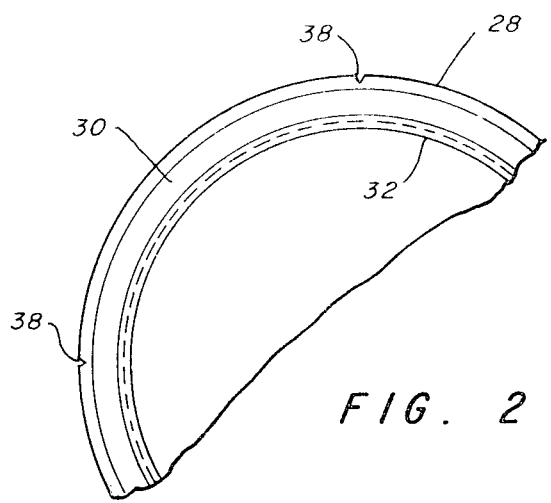
FIG. 2 is a fragmentary front elevational view of the annular seating insert element.

Referring now to FIGS. 1 and 2 a valve body 10 of any conventional form includes a body cavity chamber or space 12 which is provided to house the valve actuating mechanism and to accept a conventional bonnet and seal assembly closing said space, not shown. In this instance a ball valve closure 14 is shown in the closed position, shutting line flow. The valve body includes an inlet flow conduit 16 and outlet, not shown. The interior of the body cavity 12 is machined or otherwise formed to provide for a valve seat generally designated by the numeral 18 and which are usually provided on both the upstream and downstream sides of the valve closure ball or gate. The valve seat includes a metallic annular ring portion 20 having an inner bore 22, the diameter of which is preferably the same as the inlet opening 16. That portion of the valve seat facing the ball 14 includes a beveled face 24 and a substantially U-shaped recess 26 in which is slidably mounted an annular seal element or insert 28. This element may be constructed of any suitable material or combination of materials capable of assuring sufficient seal with the ball surface 14 when face portion 30 is in contact therewith. Preferably the insert 28 is of plastic materials such as Teflon, synthetic or natural rubber, polyesters, polyolefins such as polyethylene or polypropylene or various combinations thereof which are known or will become known during the life of this patent. The seal element 28 includes an inner bore 32 for the passage of fluids when the ball is in the open position. The rearward side of the element includes an inner annular recess 34 which is adapted to receive and retain therewith an O-ring seal 36. As shown in this view and in FIG. 2 the seal element further includes at least one groove 38, about the periphery and preferably coaxial to the element 28, although not limited thereto. The important criteria being that the groove or grooves extend from the front face of the element 28 to the rear face to provide fluid communication from the body cavity 12 to the back side of the element. In many instances a spring such as Belleville spring 40 is provided to urge the seat body portion 20 normally towards the ball 14. The outer periphery of the seat ring 20 includes a recess 42 which is provided for an O-ring seal 44 between the seat ring 20 and the body cavity.

OPERATION

The operation of the embodiment of this invention is best described with reference to the two extreme conditions which arise in the operation of valves of this nature; that is, first, where the line pressure flowing through opening 16 is greater than the pressure existing within the body cavity portion 12, and secondly, wherein the pressure existing within the body cavity portion 12 is greater than the line pressure existing at 16. Such conditions may very well arise when the ball valve is closed creating the first condition on the upstream side of the valve and the second condition on the downstream side of the valve.

Under the first conditions the line pressure, assuming flow in the direction shown by the arrow, will operate against the metallic seat body cross-sectional area which effectively extends from the inner bore 22 to the body cavity defined where the O-ring 44 makes sealed contact therewith. This pressure-area relationship and the bias of spring 40 is greater than the pressure-area relationship existing against the seal element 28 normally tending to drive it rearwardly and hence the ring 20 moves the element 28 into sealing contact with the ball.

Under the second condition wherein the body cavity 12 pressure is greater than the flow pressure the pressure therein will normally tend to drive the seat ring portion 20 rearwardly or to the left as shown in FIG. 1 but, because of the grooves 38 the body cavity pressure is now transferred to the back side of the sealing insert 28 forcing O-ring seal 36 into contact within the inner periphery of the insert and effectively forcing the insert in the opposite direction toward the ball for seating engagement therewith.

Figure 3:
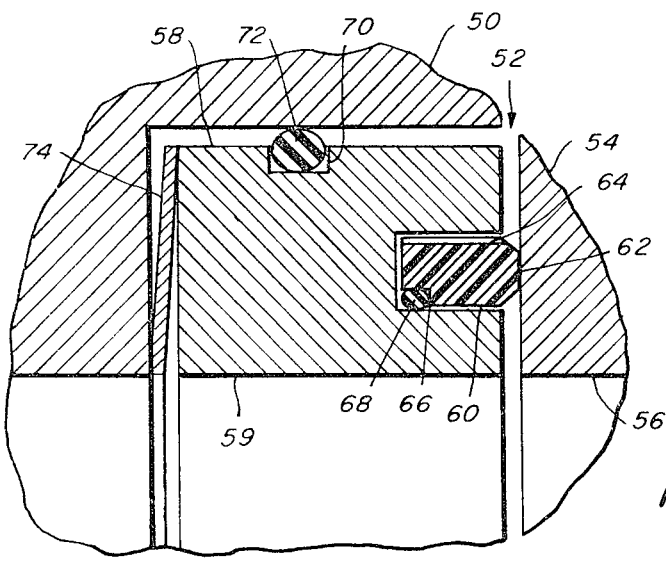
FIG. 3 is a fragmentary sectional view depicting the seat and seal assembly of this invention as modified for a gate-type valve closure element.

Referring to the embodiment of FIG. 3 a gate valve body portion 50 is adapted to receive within the body cavity portion generally designated by the numeral 52 a sliding gate member 54 having an inner bore 56 for the passage of fluids therethrough. The annular seat body 58 of this embodiment similarly includes an annular recess 60 opening toward the gate 54 to receive the insert sealing element 62. Said element similar to the embodiment of FIG. 1, includes at least one groove 64 within the outer periphery thereof. The innermost corner of the insert is cut away as at 66 to receive an O-ring seal 68. A groove 70 within the outer periphery of the seal ring 58 is adapted to receive an O-ring 72 for contact with the body for sealing the space of the body cavity between the valve body 50 and the seat ring 58. A Belleville spring 74 is provided as similarly shown in FIG. 1. The operation of this embodiment is the same as that heretofore described.

Figure 4:
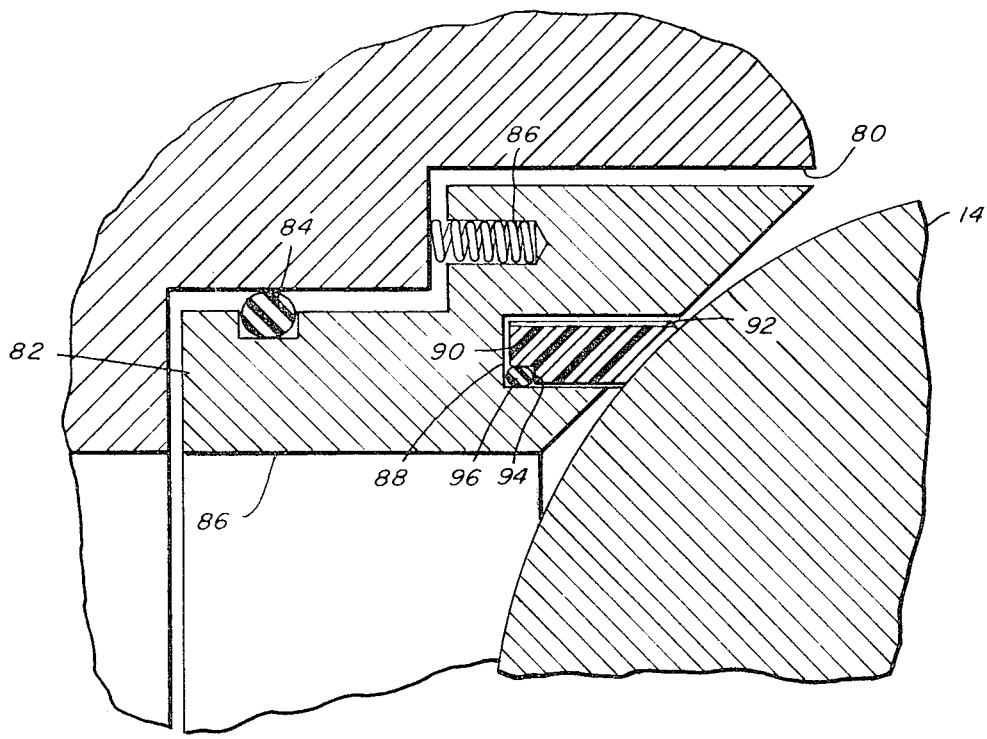
FIG. 4 is a fragmentary sectional view illustrating further modification of the invention for use with a ball-type valve closure.

In the embodiment of FIG. 4 the primary distinctions between that shown in FIG. 1 relates to a different style of body cavity 80 to which is received the metallic seat body 82 being sealed to the body by an O-ring 84. The design is similar to that described in said copending application. A plurality of coil springs 86 are provided to provide biasing force to the seat body 82 in a direction towards the ball 14. Similarly the seat body includes an inner bore 86 and a recess 88 opening towards the ball 14 and which is adapted to receive an insert 90 having one or a plurality of peripheral grooves 92 and the inner seal recess 94 for O-ring 96. The operation of this embodiment is identical to that heretofore described.

What is claimed is:

1. In a valve having a valve seat positionable in a valve body cavity for sealed engagement with the valve closure the improvement of said seat comprising:

a metallic ring slidably movable in said cavity, said ring defining:

a forward face portion directed toward said closure;

means to seal between the outer periphery of said ring and said valve body;

an annular recess in said forward face portion;

an annular seal insert slidably movable in said annular recess and having a face portion in sealed engagement with said closure;

at least one groove in the outer periphery of said insert to provide communication of the body cavity from said face portion to the rear portion of said insert; and means to seal the space between the inner periphery of said insert and said recess.

2. A valve of claim 1 wherein said closure is a ball-type valve closure.

3. A valve of claim 1 wherein said closure is a gate-type valve closure.

4. A valve of claim 1 wherein said insert is a non-metallic material.

5. A valve of claim 1 wherein said insert includes a recess at the corner defined by said inner periphery and said rear portion to receive an O-ring seal.

6. A valve of claim 1 including spring means to normally bias said metallic ring toward said closure.

References Cited
UNITED STATES PATENTS

| | | | |
|---|---|---|---|
| 2,664,267 | 12/1953 | Ray | 251—174 |
| 3,416,558 | 12/1968 | Works | 251—174 X |
| 3,584,641 | 6/1971 | Milleville | 251—174 X |

HAROLD W. WEAKLEY, Primary Examiner

U.S. Cl. X.R.

251—174, 315, 317